Patented Apr. 14, 1942

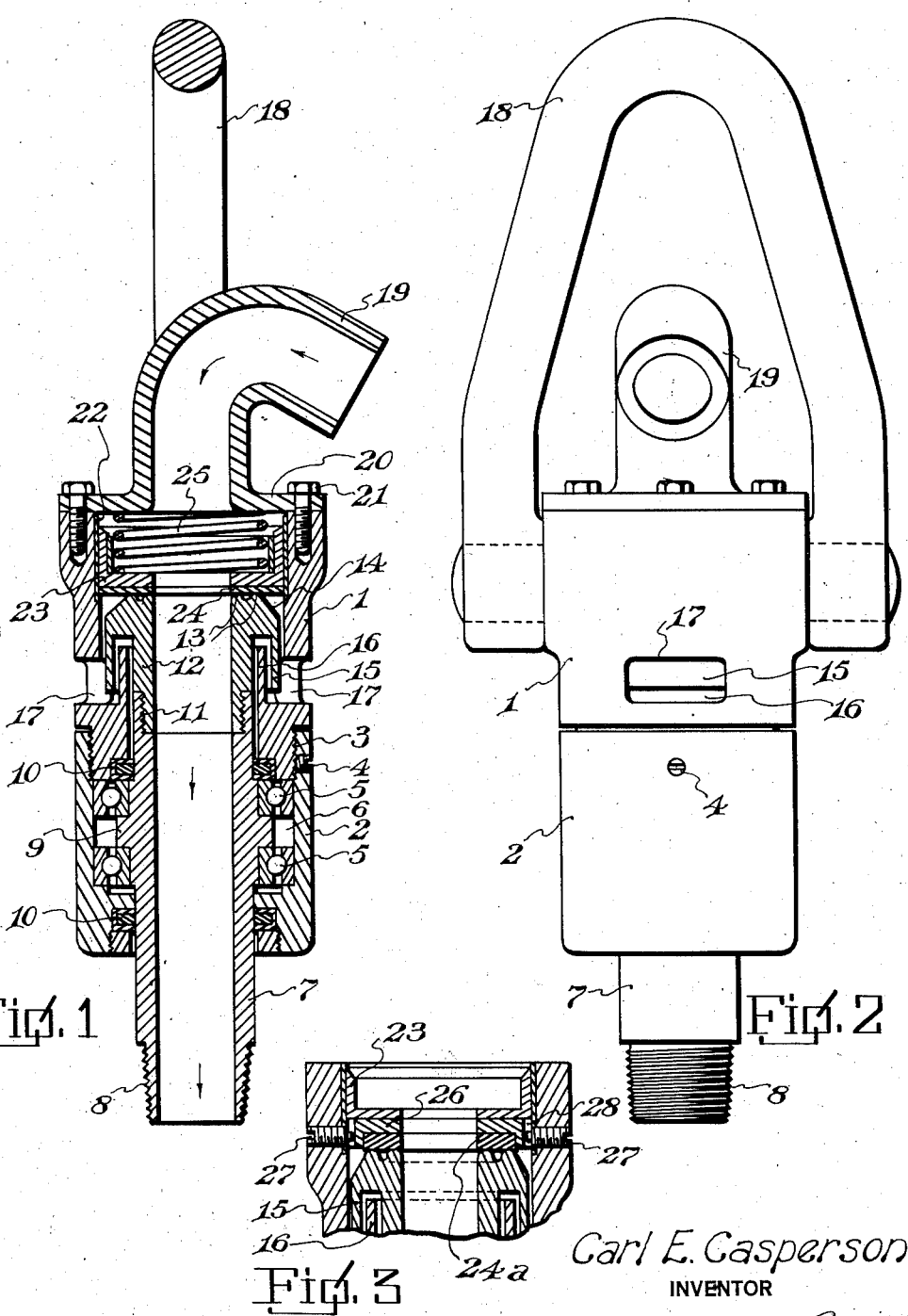

2,279,969

UNITED STATES PATENT OFFICE 2,279,969

SWIVEL JOINT FOR ROTARY DRILLING

Carl E. Casperson, Tulsa, Okla.

Application August 29, 1941, Serial No. 408,888

5 Claims. (Cl. 285—97.5)

The invention relates to swivel joints for rotary drill strings, and has for its object to provide a device of this kind comprising a stationary body, in which body is rotatably mounted in bearings a rotatable section, adapted to be rotated by a "kelley," and the upper end of said section provided with a seat with which a spring pressed and pressure seated wear disc member engages for reducing leakage of the mud as it circulates, during the drilling operation, and to provide means between the wear disc and the bearings whereby any leakage to the outside of the rotatable section will be deflected downwardly and outwardly and discharged through the stationary body member, thereby preventing fouling of the bearings.

A further object is to provide a cup shaped member above the wear disc and normally forced downwardly by an expansion spring interposed between the cup and the cover plate.

A further object is to provide the upper end of the rotatable section with a removable section having a downwardly extending annular apron over which leakage is deflected and the body member with an upwardly extending annular flange within the apron for preventing flow of leakage to the bearings.

A further object is to provide oil sealing rings above and below the bearings for further protecting the bearings from fouling.

A further object is to provide the cover plate with an angle extension to which a hose connection may be attached for supplying the mud for the drilling operation.

A further object is to form the body from an upper stationary portion having a supporting shackle and a lower removable portion which houses the bearings.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a vertical transverse sectional view through the swivel joint.

Figure 2 is a front elevation of the swivel joint.

Figure 3 is a vertical transverse sectional view through a modified form of inverted cup, seat and wear disc.

Referring to the drawing, the numeral 1 designates the upper section of the stationary body, 2 the lower section and 3 the left hand threaded connection between the upper and lower body sections. The body sections 1 and 2 are held against rotation in relation to each other by means of a set screw 4.

Rotatably mounted in anti-frictional bearings 5 in the chamber 6 of the section 2 is a rotatable section 7, adapted to be attached to a conventional form of "kelley" at 8, so that said section rotates with the "kelley." It will be noted that the anti-frictional bearings 5 are of the ball and ring type, and these bearings are disposed on opposite sides of an annular flange 9 carried by the rotatable section 7. Disposed to the outside of the bearings 5 are oil rings 10, adapted to assist in preventing foreign matter from entering the bearings and fouling the same.

Threaded at 11 into the upper end of the rotatable section 7 is a seat member 12 having concentric seat 13 on its upper end. The upper end of the seat member 12 is frusto conically shaped as at 14 and is provided with an annular downwardly extending apron 15, which overlies and houses the upper portion of an upwardly extending annular flange 16 carried by the stationary body portion 1, therefore it will be seen that any leakage of mud or fluid past the seat 13 will flow downwardly over the outer periphery of the downwardly extending apron 15 and outwardly through the discharge apertures 17 in the body portion 1. The apron 15 rotates while the annular flange 16 is stationary. By deflecting the leakage and providing the overlapping apron and flange, it is obvious the mud or fluid leakage will not pass downwardly into the bearings 5—5 and foul the same.

The body section 1 is provided with a bail or shackle 18 for supporting the device, and also with a hose connection elbow 19 to which the mud hose may be attached for forcing the mud downwardly through the device during the drilling operation. The connection 19 is provided with a cover plate 20 secured by means of bolts 21 to the upper end of the stationary body section 1.

Disposed within the upper end of the body portion 1 is a liner 22, which is stationary, and mounted within the liner is an annular cup shaped pliable member 23, which rests on the upper side of the annular wear disc 24 which engages the seats 13. The disc 24 is normally forced downwardly by the expansion spring 25, which spring is interposed between the cover plate 20 and the bottom of the annular cup. The expansive action of the spring 25 is sufficient to maintain seating of the wear disc 24 under normal conditions, however when the mud or fluid is forced downwardly through the connection, the spring action is supplemented by the pressure of the fluid within the cup. It has been found when the wear disc 24 becomes worn, leakage will develop and when this occurs the leakage is discharged over the apron 15 through the discharge apertures 17.

Referring to the modified form of wear disc shown in Figure 3, the cup 23 is substantially the same structure as shown in Figure 1, however the wear disc 24a is mounted in a chamber of a floating plate 26, and the floating plate is guided and held against rotation by means of dog point screws 27, which extend into vertical slots 28 in opposite sides of the floating plate, therefore it will be seen that a structure is provided wherein any type of material may be used, flexible or pliable, for the valve and said valve may be reversed when it becomes worn on one side.

From the above it will be seen that a swivel joint is provided which is simple in construction, provided with a pressure and spring seated wear disc and one wherein a deflecting apron is provided which will prevent leakage from entering the supporting bearing for the rotatable parts thereof.

The invention having been set forth what is claimed as new and useful is:

1. A swivel joint through which fluid passes, said joint comprising a stationary body portion, a rotatable member extending upwardly into said body portion, a seat carried by the upper end of said rotatable member, a packing member mounted in the body member and cooperating with the valve seat, a mud line connecting member carried by the upper end of the body member, an expansion spring interposed between the mud line connecting member and the packing member cooperating with the seat, a downwardly extending apron carried by the upper end of the upwardly extending member and rotatable therewith, and an upwardly extending flange carried by the body portion and extending upwardly within the apron, thereby deflecting leakage outwardly through openings in the body member and to the outside of the body member.

2. The combination with a swivel connection through which fluid passes, said connection comprising a stationary body portion, an upwardly extending rotatable portion having a bearing in the lower end of the body portion, a packing member within the body portion and cooperating with a seat on the upper end of the upwardly extending portion, of a downwardly extending leakage deflecting apron carried by the upper end of the upwardly extending portion in spaced relation thereto and an upwardly extending member carried by the body portion and extending into the apron, said apron forming means for deflecting fluid leakage outwardly through discharge openings in the body portion.

3. A device as set forth in claim 2 including anti-frictional bearings within the lower portion of the body portion and supporting the upwardly extending member.

4. A device as set forth in claim 2 wherein the seat comprises concentric members, a wear disc engaging said concentric members, a cup engaging the upper side of the wear disc and an expansion spring within the cup and normally forcing the same downwardly.

5. A device as set forth in claim 2 wherein the wear disc is disposed in a chamber of a floating plate and dog point screws extending through the body and into vertical slots in the floating plate.

CARL E. CASPERSON.